(12) United States Patent
Venkata

(10) Patent No.: US 9,367,247 B2
(45) Date of Patent: *Jun. 14, 2016

(54) MEMORY ACCESS REQUESTS IN HYBRID MEMORY SYSTEM

(71) Applicant: Seagate Technology LLC, Cupertino, CA (US)

(72) Inventor: Sumanth Jannyavula Venkata, Shakopee, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 361 days.

This patent is subject to a terminal disclaimer.

(21) Appl. No.: 13/971,773

(22) Filed: Aug. 20, 2013

(65) Prior Publication Data

US 2015/0058526 A1    Feb. 26, 2015

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |
| G06F 12/08 | (2016.01) | |

(52) U.S. Cl.
CPC ............... *G06F 3/061* (2013.01); *G06F 3/068* (2013.01); *G06F 3/0659* (2013.01); *G06F 12/08* (2013.01)

(58) Field of Classification Search
CPC .... G06F 3/0685; G06F 3/0604; G06F 3/0658
USPC ................................................ 711/103, 154
See application file for complete search history.

(56) References Cited

U.S. PATENT DOCUMENTS

| | | | |
|---|---|---|---|
| 4,899,230 A * | 2/1990 | Sherritt | 360/15 |
| 5,274,768 A | 12/1993 | Traw et al. | |
| 5,420,998 A | 5/1995 | Horning | |
| 5,644,789 A | 7/1997 | Matthews et al. | |
| 6,339,811 B1 | 1/2002 | Gaertner et al. | |
| 6,549,992 B1 | 4/2003 | Armangau et al. | |
| 6,594,733 B1 * | 7/2003 | Cardente | G06F 12/0817 711/141 |
| 6,948,015 B2 | 9/2005 | Ogasawara et al. | |
| 7,181,578 B1 * | 2/2007 | Guha et al. | 711/154 |
| 7,305,526 B2 | 12/2007 | Benhase et al. | |
| 7,613,876 B2 | 11/2009 | Bruce et al. | |

(Continued)

FOREIGN PATENT DOCUMENTS

EP        1890236        2/2008

OTHER PUBLICATIONS

U.S. Appl. No. 13/542,990, filed Jul. 6, 2012, Sawin et al.

(Continued)

*Primary Examiner* — Sheng-Jen Tsai

(57) ABSTRACT

Incoming memory access requests are routed in a set of incoming queues, the incoming memory access requests comprise a range of host logical block addresses (LBAs) that correspond to a memory space of a primary memory. The host LBA range is directly mapped to clusters of secondary memory, the secondary memory corresponding to a memory space of a secondary memory. Each incoming memory access request queued in the set of incoming queues is transformed into one or more outgoing memory access requests that include a range of secondary memory clusters or one or more clusters of secondary memory clusters. The outgoing memory access requests are routed in a set of outgoing queues. The secondary memory is accessed using the outgoing memory access requests.

18 Claims, 16 Drawing Sheets

(56) References Cited

U.S. PATENT DOCUMENTS

| | | | |
|---|---|---|---|
| 7,769,970 B1* | 8/2010 | Yeh et al. | 711/158 |
| 7,979,631 B2 | 7/2011 | Ahn et al. | |
| 7,996,642 B1* | 8/2011 | Smith | 711/167 |
| 8,015,360 B2 | 9/2011 | Hong et al. | |
| 8,032,700 B2 | 10/2011 | Bruce et al. | |
| 8,180,964 B1 | 5/2012 | Koh et al. | |
| 8,341,339 B1 | 12/2012 | Boyle et al. | |
| 8,489,820 B1 | 7/2013 | Ellard | |
| 8,583,879 B2 | 11/2013 | Na et al. | |
| 2002/0002655 A1 | 1/2002 | Hoskins | |
| 2002/0176430 A1 | 11/2002 | Sangha et al. | |
| 2003/0105937 A1 | 6/2003 | Cooksey et al. | |
| 2003/0105938 A1 | 6/2003 | Cooksey et al. | |
| 2003/0105940 A1 | 6/2003 | Cooksey et al. | |
| 2003/0196042 A1 | 10/2003 | Hopeman et al. | |
| 2003/0200393 A1 | 10/2003 | Cornaby et al. | |
| 2004/0123043 A1 | 6/2004 | Rotithor et al. | |
| 2005/0108491 A1 | 5/2005 | Wong et al. | |
| 2005/0172074 A1 | 8/2005 | Sinclair | |
| 2006/0184949 A1* | 8/2006 | Craddock et al. | 719/314 |
| 2006/0248387 A1 | 11/2006 | Nicholson et al. | |
| 2007/0022241 A1 | 1/2007 | Sinclair | |
| 2007/0136523 A1 | 6/2007 | Bonella et al. | |
| 2007/0250665 A1 | 10/2007 | Shimada | |
| 2007/0288692 A1* | 12/2007 | Bruce et al. | 711/113 |
| 2008/0059694 A1 | 3/2008 | Lee | |
| 2009/0106481 A1 | 4/2009 | Yang et al. | |
| 2009/0157918 A1* | 6/2009 | Jin et al. | 710/39 |
| 2009/0193193 A1* | 7/2009 | Kern | 711/128 |
| 2009/0300628 A1* | 12/2009 | Patil et al. | 718/102 |
| 2010/0023682 A1 | 1/2010 | Lee | |
| 2010/0115172 A1 | 5/2010 | Gillingham et al. | |
| 2010/0217952 A1 | 8/2010 | Iyer et al. | |
| 2010/0325352 A1 | 12/2010 | Schuette et al. | |
| 2011/0145489 A1 | 6/2011 | Yu et al. | |
| 2012/0191936 A1 | 7/2012 | Ebsen et al. | |
| 2012/0210041 A1* | 8/2012 | Flynn et al. | 711/3 |
| 2012/0266175 A1 | 10/2012 | Zheng | |
| 2012/0311237 A1 | 12/2012 | Park | |
| 2012/0317364 A1 | 12/2012 | Loh | |
| 2013/0024625 A1 | 1/2013 | Benhase et al. | |
| 2013/0179486 A1* | 7/2013 | Lee et al. | 709/201 |
| 2013/0191601 A1 | 7/2013 | Peterson et al. | |
| 2013/0212319 A1* | 8/2013 | Hida et al. | 711/103 |
| 2013/0246688 A1 | 9/2013 | Kanno et al. | |
| 2013/0268728 A1 | 10/2013 | Ramanujan et al. | |
| 2013/0339617 A1 | 12/2013 | Averbouch et al. | |
| 2014/0013025 A1* | 1/2014 | Jannyavula Venkata | G06F 12/0246 711/103 |
| 2014/0013026 A1* | 1/2014 | Jannyavula | G06F 12/0246 711/103 |
| 2014/0207997 A1 | 7/2014 | Peterson et al. | |
| 2015/0033226 A1* | 1/2015 | Phelan et al. | 718/1 |
| 2015/0058527 A1* | 2/2015 | Venkata | G06F 12/0873 711/103 |

OTHER PUBLICATIONS

U.S. Appl. No. 13/543,036, filed Jul. 6, 2012, Sawin et al.
U.S. Appl. No. 13/543,079, filed Jul. 6, 2012, Venkata et al.
U.S. Appl. No. 13/543,100, filed Jul. 6, 2012, Venkata et al.
U.S. Appl. No. 13/543,123, filed Jul. 6, 2012, Sawin et al.
U.S. Appl. No. 13/543,303, filed Jul. 6, 2012, Venkata et al.
Hallnor et al., "A Fully Associative Software-Managed Cache Design", ISCA '00 Proceedings of the 27th Annual International Symposium on Computer Architecture, 2000, pp. 107-116.
Ahmadi et al., "A Cache Architecture for Counting Bloom Filters", 15th IEEE International Conference on Networks, 2007, pp. 218-223.
Jan. 19, 2016, File History for U.S. Appl. No. 13/543,100 as retrieved from U.S. Patent and Trademark Office.
Jan. 19, 2016, File History for U.S. Appl. No. 13/543,303 as retrieved from U.S. Patent and Trademark Office.
Sep. 27, 2015, File History for U.S. Appl. No. 13/543,100 as retrieved from U.S. Patent and Trademark Office.
Oct. 13, 2015, File History for U.S. Appl. No. 13/543,303 as retrieved from U.S. Patent and Trademark Office.

* cited by examiner

MEMORY ACCESS REQUESTS IN HYBRID MEMORY SYSTEM

SUMMARY

According to some embodiments, a memory device includes a hybrid controller configured to manage data transfers between a host processor and a secondary memory. The secondary memory is configured to serve as a cache for a primary memory that includes a memory space corresponding to host logical block addresses (LBAs). The hybrid controller is arranged to receive incoming memory access requests from the host processor, the memory access requests including a range of host LBAs, route the incoming memory access requests to a set of incoming queues, directly map the range of host LBAs into clusters of secondary memory, transform each incoming memory access requests into one or more outgoing memory access requests, each outgoing memory access request including a range or cluster of secondary memory, route the outgoing memory access requests from the incoming queues into a set of outgoing queues, and access the secondary memory using the outgoing memory access requests.

Some embodiments involve a method of operating a hybrid memory system that includes a primary memory and a secondary memory. Incoming memory access requests are routed in a set of incoming queues, the incoming memory access requests comprise a range of host logical block addresses (LBAs) that correspond to a memory space of the primary memory. The host LBA range is directly mapped to clusters of secondary memory, the secondary memory clusters corresponding to a memory space of the secondary memory. Each incoming memory access request queued in the set of incoming queues is transformed into one or more outgoing memory access requests. The outgoing memory access requests include a range of secondary memory or one or more clusters of secondary memory. The outgoing memory access requests are routed in a set of outgoing queues. The secondary memory is accessed using the outgoing memory access requests.

Some embodiments involve a controller for a hybrid memory system that includes a hybrid controller configured to manage data transfers between a host processor and a flash memory, the flash memory configured to serve as a cache for a magnetic disk. The hybrid controller includes multiple layers including a flash content and transfer management (FCTM) layer. The FCTM layer is configured to receive the incoming memory access requests from a higher layer of the hybrid controller, route the incoming data access requests in a set of incoming queues, transform each of the memory access requests from the set of incoming queues into a plurality of outgoing memory access requests, route the plurality of outgoing memory access requests in a set of outgoing queues send the outgoing memory access requests to a lower layer of the hybrid controller.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a primary memory and at least one other type of memory is used as a secondary memory that operates as a cache. The primary memory may have greater storage capacity but slower access times than the secondary memory, for example. In this arrangement, the secondary memory can serve as a read cache and/or a write cache for the primary memory. One example of such a tiered memory device is a hybrid drive, in which the primary memory may comprise nonvolatile memory such as magnetic disk, magnetic tape, and/or optical disk and the secondary memory may comprise solid state flash memory, and/or the secondary memory may be a nonvolatile or volatile memory with or without battery backup. Note that the terms "primary memory" and "secondary memory" are used herein for identification of components used in a hybrid memory system and to denote differences in memory (e.g., usage, capacity, performance, memory class or type, etc.) and not necessarily order or preference. Furthermore, although examples provided herein refer to the primary memory as magnetic disk and to secondary memory as flash memory, the disclosed approaches are applicable to any types of primary and secondary memory.

Embodiments described herein relate to systems and methods for transfers to and from the primary memory and the secondary memory. The transfers are used to manage memory access requests. The memory access requests may involve reading the secondary memory, writing to the secondary memory, and so forth. In various embodiments, management and implementation of the memory access requests is accomplished by using a set of incoming queues and a set of outgoing queues.

Figure 1A:
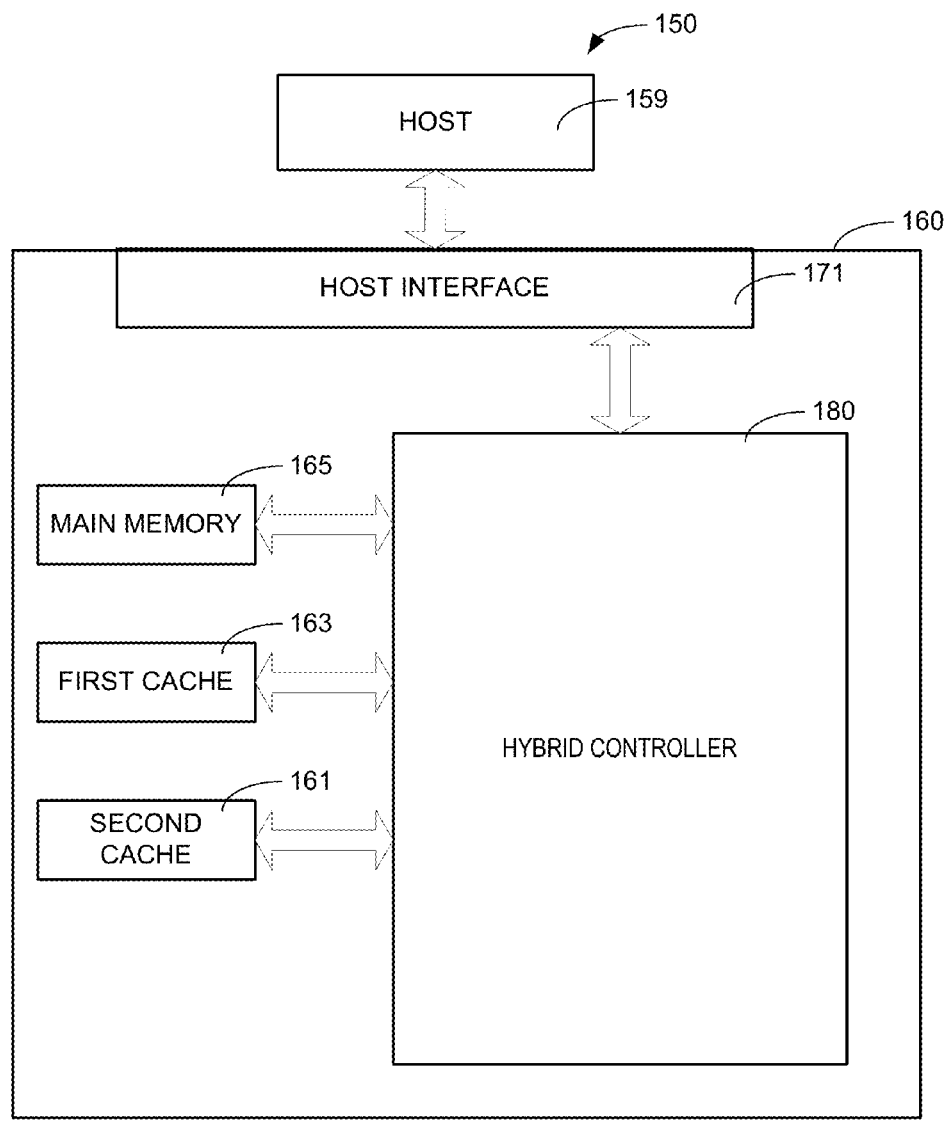
FIG. 1A is a block diagram of a hybrid memory system configured to manage memory access requests in accordance with some embodiments.

FIG. 1A is a diagram of a system 150 that includes a hybrid memory 160 comprising a number of memory components including a main memory 165, a first cache 163 and a second cache 161. The hybrid memory 160 is coupled to a host processor 159 through a host interface 171. The host interface 171 communicatively couples the host processor 159 to a hybrid controller 180. The first cache 163 and the second cache 161 can be configured to temporarily store data transferred to or from the host 159 to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests received from the host 159 are managed by the hybrid controller 180 to cause data to be written to and/or read from the hybrid drive with optimal efficiency. The second cache 161 in this example may optionally be a type of read cache referred to as read-only, in that only data marked for read operations by the host 159 are placed in the second cache 161. In such a configuration, data marked for writing to the main memory 165 are sent to the main storage 165, either directly or via the first cache 163. According to some embodiments, the hybrid memory device 160 (also denoted hybrid drive) may be implemented using a controller 180 configured as a hierarchy of abstraction layers. Pairs of the abstraction layers are communicatively coupled through application programming interfaces (APIs). The organization of the hybrid controller 180 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components 161, 163, 165 are not restricted to these types of memory and may be implemented using a wide variety of memory types.

In some configurations, the cache 161 may be configured as a secondary cache, and may be faster and smaller than the main storage 165. The cache 163 is a primary cache, and may be faster and smaller than the secondary cache 161. For example, current read/write requests from the host 159 may be processed first via the primary cache 163 (e.g., identified by the data's logical block address). This enables host commands to complete quickly should the requested data be stored in the primary cache 163. For host read requests, if there is a miss in the primary cache 163 i.e., the requested data is not present in the primary cache, the requested data may be searched for in the secondary cache 161. If not found in either, requested data may be accessed via the main storage 165.

Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
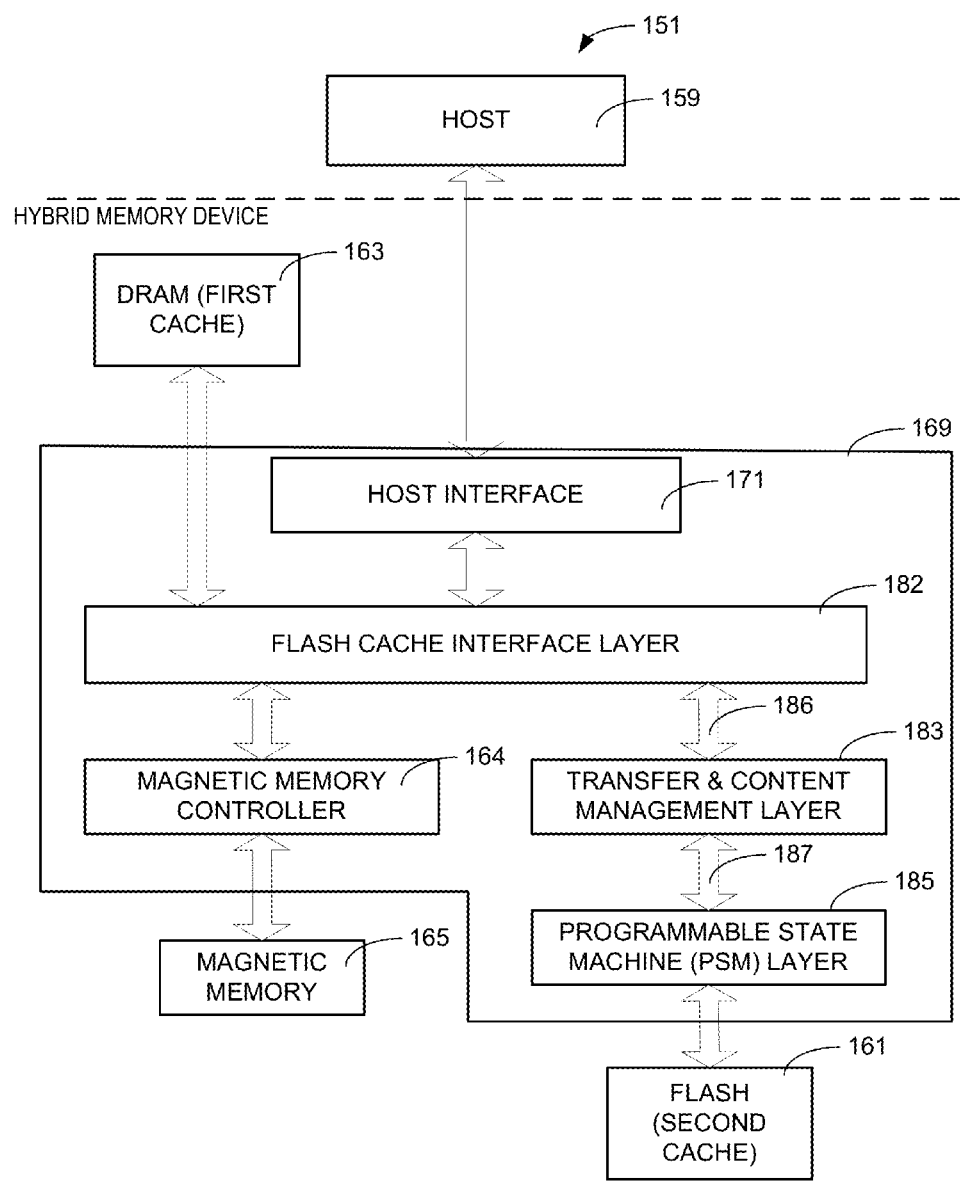
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device. The hybrid memory device includes a magnetic memory 165 which serves as the main memory, dynamic random access memory (DRAM) 163 arranged as a first cache, and flash memory 161 arranged as a second cache. In this configuration, the flash cache 161 acts as a second cache, and may be faster but smaller than the main memory 165. The DRAM 163 serves as the first cache, and may be faster but smaller than the flash cache 161. While there is some processing and data transfer overhead in using the one or more caches 163, 161, the faster storage media used by the caches can enhance overall performance of the apparatus hybrid memory device.

The host processor 159 communicates with the hybrid memory device (also referred to herein as hybrid drive) through a host interface 171. As previously discussed, the main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory 165 are referred to herein as host LBAs.

The host 159 sends memory access requests to the hybrid memory device, for example, the host 159 may request that data be written to and/or read from the hybrid memory device. The host interface 171 is configured to transfer memory access requests from the host 159 to other components of the hybrid memory device and to transfer data between the host 159 and the hybrid memory device.

The hybrid controller 169 illustrated in FIG. 1B includes number of layers 182, 183, 185 wherein each layer communicates to its nearest neighboring layer(s), e.g., through a set of requests. For example, each layer 182, 183, 185 may only communicate to its nearest neighboring layer(s) without communicating to other layers. As an example, the layer 182 may only communicate directly to layer 183 and the host interface 171, without communicating directly with the layer 185 or to the flash 161. As an operation, such as a memory access request from the host 159, is being carried out, each layer 182, 183, 185 is configured to pass control to the next lower layer as the operation is implemented.

The example illustrated in FIG. 1B includes three layers 182, 183, 185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers can be similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; and the programmable state machine (PSM) layer 185. Requests and/or data may be passed between the layers as indicated by arrows 186, 187 from a higher layer to the next lower layer starting with the FCI layer 182 and proceeding to the PSM layer 185 which interacts directly with the flash memory 161. The layered architecture of the hybrid controller 169 described herein allows for handling host memory access requests which can be serviced from either the magnetic memory 165 or one of the caches 163, 161 The layered structure used in conjunction with the flash cache 161 can be configured to achieve specified rates and response times for servicing memory access requests.

The FCI layer 182 decides whether a host read request should be serviced from the primary magnetic memory 165 or from one of the caches 163, 161. The FCI layer 182 implements processes to determine which data should be promoted to the flash secondary cache 161 and/or the primary cache 163 based on various criteria to achieve optimal workload for the hybrid memory device. The flash content and transfer management (FCTM) layer 183 maintains a mapping, e.g., a fully associative mapping as discussed below, of the host LBAs to a memory space corresponding to the flash memory space arranged in clusters. The FCTM layer 183 interacts with an programmable state machine (PSM) layer 185 and performs tasks such as optimal scheduling of promotion requests among dies of the flash (referred to as die scheduling), wear leveling, garbage collection and so forth.). The PSM layer programs hardware controllers to generate the required signals to read from and write to the flash 161, for example.

In some cases, one or more of the layers 182, 183, 185 of the hybrid controller 169 may be implemented by circuitry and/or by one or more processors, e.g., such as reduced instruction set computer (RISC) processors available from ARM. In some cases each layer 182, 183, 185 may be implemented by a separate processor. The processes discussed herein are implementable in hardware (interconnected electronic components that carry out logic operations) and/or by a processor implementing software instructions, e.g., stored in a computer readable medium, and/or by any combination of hardware and software.

Figure 2:
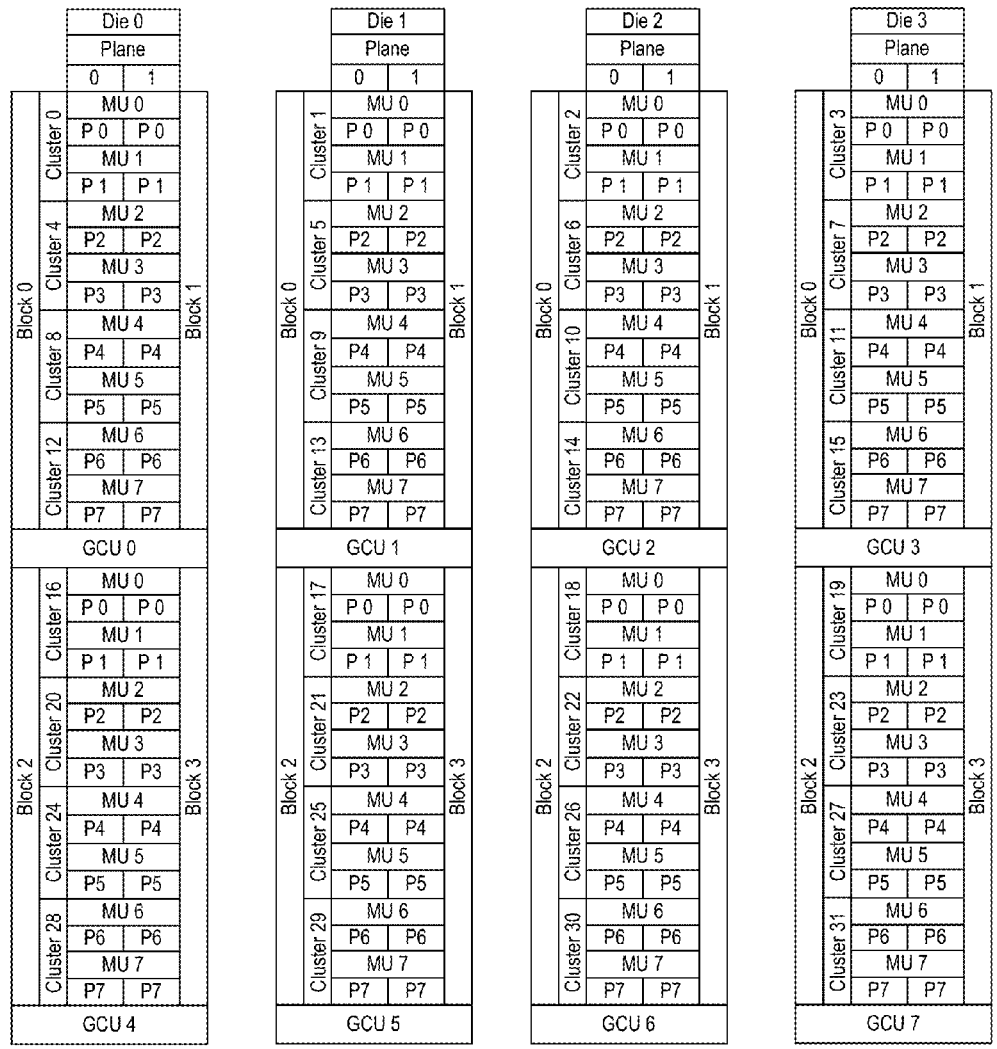
FIG. 2 illustrates a way to partition the flash into clusters according to various aspects.

As described previously, the HDD host LBA space and flash physical address space are partitioned into units of clusters that may be sized to contain a whole number of sectors of data. Protection Information (PI) and error correction data may be stored in the cluster. The flash geometry determines the cluster size. In flash geometry according to some embodiments, a cluster is defined to contain one or more map units (MU). A MU can be defined to be the maximum amount of data that can be transferred to or from the flash in a single flash operation. For example, the MU for a dual plane flash may be two pages and for quad plane may be four pages. FIG. 2 illustrates a way to partition the flash into clusters for a four die, dual plane system. Each cluster spans two planes and two MUs. There are two garbage collection units (GCUs) per die. Clusters and GCUs are intentionally defined not to span die in order to be able to handle full die failures.

Embodiments described herein involve processes implemented by the FCTM layer to manage memory access requests received from the FCI layer, translated through the FCTM layer and sent to the PSM layer. The memory access requests may involve reading the flash memory, writing to the flash memory, and so forth. In various embodiments, management and implementation of the memory access requests is accomplished in the FCTM layer using a set of incoming queues and a set of outgoing queues.

Figure 3:
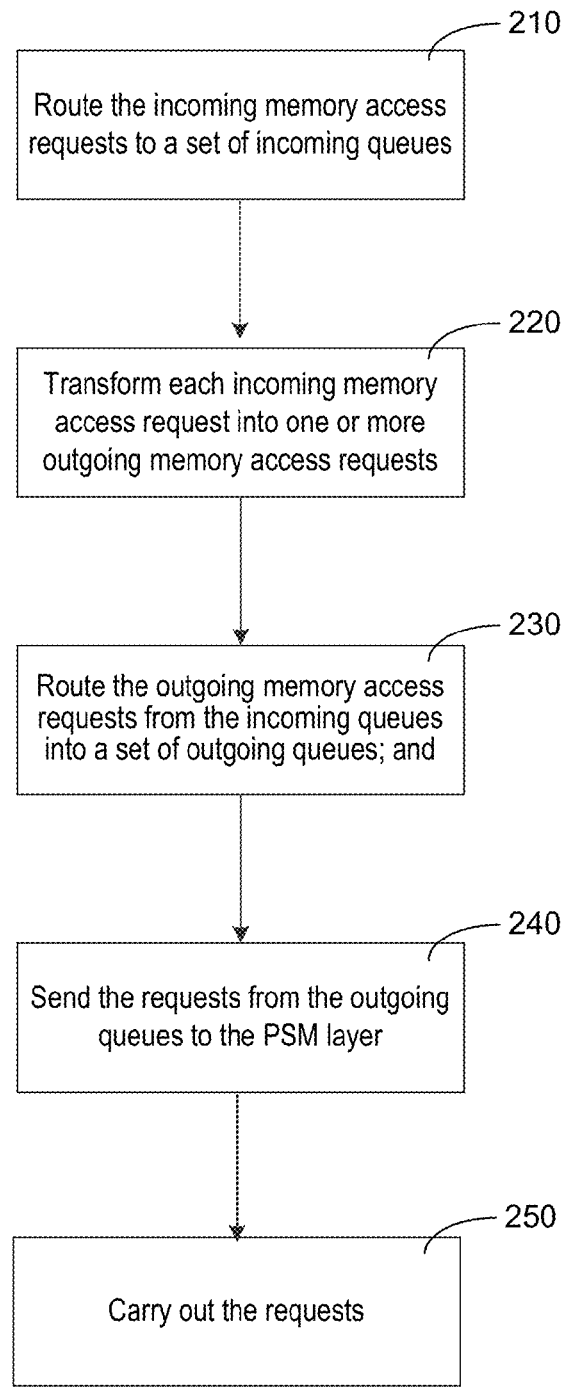
FIG. 3 is flow diagram illustrating a process of managing memory access requests in accordance with some embodiments.

FIG. 3 is a flow diagram that illustrates a process of managing memory access requests in the FCTM layer. Memory access requests are received by the FCTM layer from the FCI layer and PSM interface requests are sent to the PSM layer by the FCTM layer. Memory access requests (sometimes referred to herein as incoming memory access requests, or as incoming requests because these requests are incoming from the perspective of the FCTM layer) are received by the FCTM layer from the FCI layer. The incoming requests are routed 210 into a set of incoming queues. The memory access requests queued in the incoming queues are transformed 220 into outgoing memory access requests. The outgoing requests are routed 230 to a set of outgoing queues. The outgoing requests in the outgoing queues are sent 240 to the PSM layer which carries out 250 the requests to perform the operations specified in the requests.

Figure 4A:
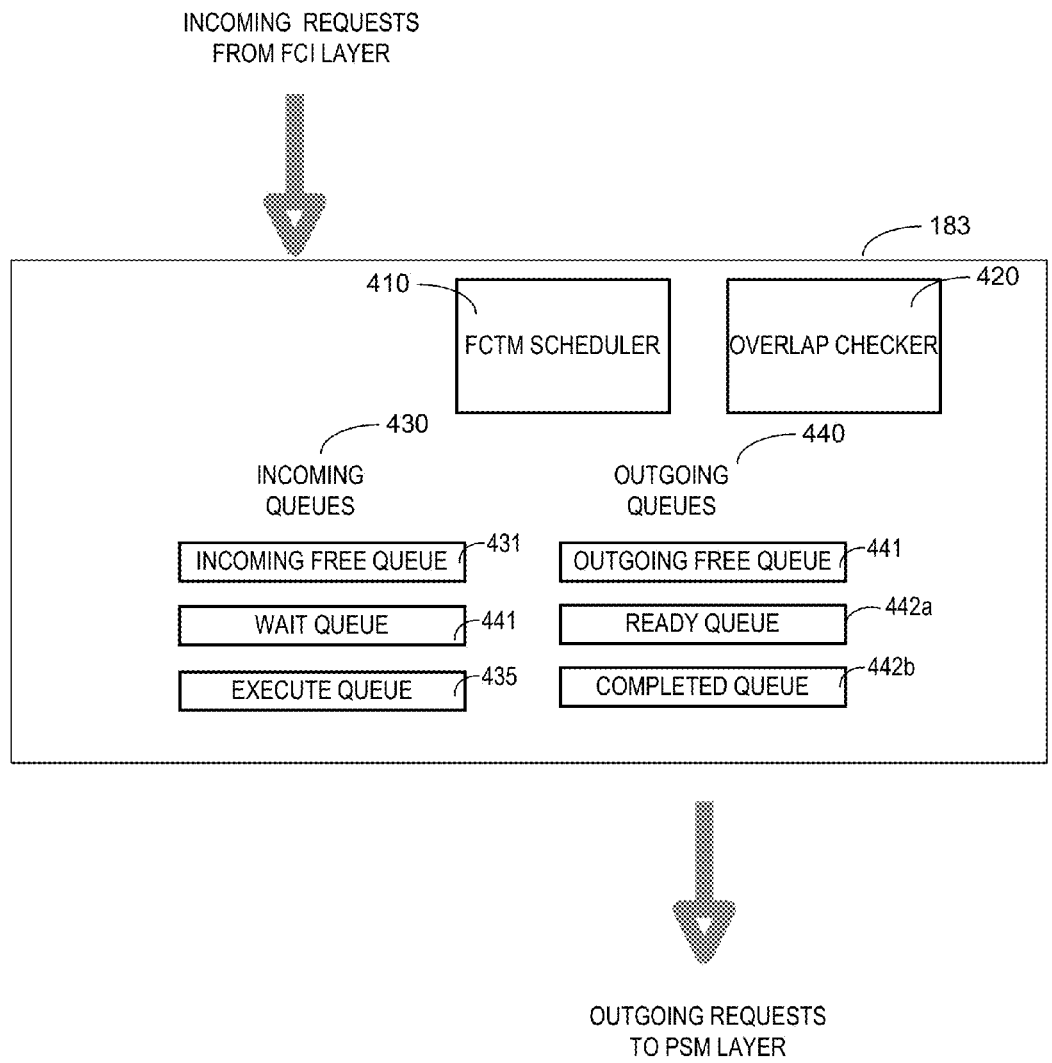
FIG. 4A illustrates the organization of various components of the a hybrid controller in accordance with some embodiments.
Figure 4B:
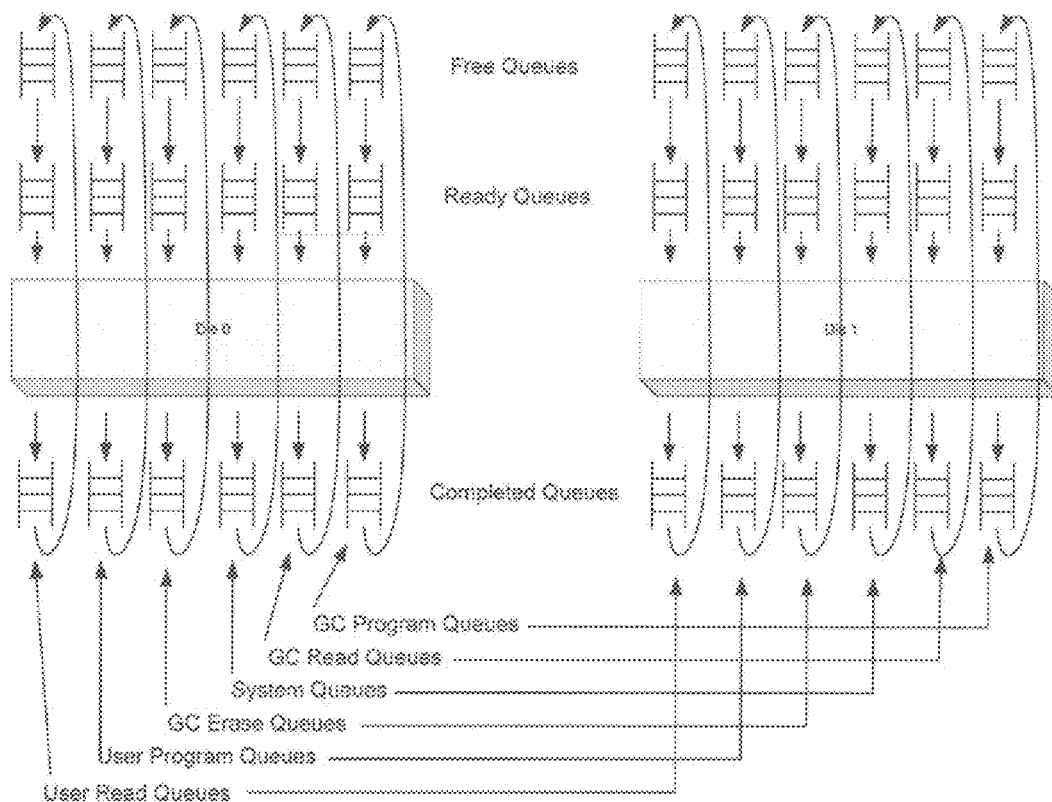
FIG. 4B diagrammatically illustrates the flow of memory access requests in various queues of the hybrid controller in accordance with various embodiments.

FIG. 4A illustrates the organization of various components of the FCTM layer 183, and FIG. 4B diagrammatically illustrates the flow of memory access requests/PSM interface requests among the queues. As depicted in FIG. 4A, the FCTM layer 183 includes a FCTM scheduler 410 which is responsible for various scheduling operations of the FCTM layer 183 such as routing incoming memory access requests and/or outgoing requests among the various queues 430-442 of the FCTM layer 183. The FCTM layer 183 also includes an overlap checker 420 configured to determine if there is an overlap between the memory access requests. An overlap may occur if there is an overlap in the host LBA ranges of two memory access requests.

The overall structure of the incoming queues 430 and the outgoing queues 440 is illustrated in FIG. 4A. The incoming queues 430 include an incoming free queue 431, a wait queue 430, and an execute queue 435. The incoming free queue 431 includes nodes which are used to control the flow of memory access requests into the execute queue 435. Generally, the FCTM scheduler 410 routes incoming memory access requests from the FCI layer into the wait queue 432 only if a node is available in the incoming free queue 431. The number of nodes in the incoming free queue 431 represent the capacity of the FCTM layer 183 at any particular time to process incoming memory access requests.

If a node is available in the incoming free queue 431, that node becomes "occupied" by an incoming memory access request when the memory access request is routed 451 into the wait queue 432. When a node is occupied by a memory access request, information about the memory access request is stored in the node. For example, the node may store information about the type of memory access request, the host LBAs involved in the memory access request, information about the progress of the memory access request, such as how much data has been transferred in conjunction with the memory access request, how much work to complete the memory access request is pending and so forth. If a node is not available in the incoming free queue 431, then the FCTM layer does not have the capacity to process the incoming memory access request and an error message is generated.

In some cases, when a particular memory access request in the execute queue 435 is transformed into a number of PSM interface requests. Each of the PSM interface requests represents outstanding work to the PSM layer. As nodes become available in the outgoing free queue 441 to execute a memory access request in the execute queue 435, those available outgoing nodes become "occupied" by the PSM interface requests associated with the memory access request which is being executed. The PSM interface requests associated with the memory access request being executed are transferred to an outgoing ready queue 442a. The memory access request being executed may remain in the ready queue 442a (occupying a node from the incoming free queue) until execution of the memory access request by the FCTM layer is complete. Execution of a memory access request in the FCTM layer may be deemed to be complete when the responsibility for processing the memory access request is transferred from the FCTM layer to the PSM layer. This occurs after all the PSM interface requests associated with a memory access request are issued to the PSM layer. For example, responsibility may be transferred when the last PSM interface request associated with a memory access request is successfully transferred to the PSM layer or when the last PSM interface request associated with the memory access request has been successfully completed by the PSM layer and acknowledgement of the successful completion of the PSM interface request has been received by the FCTM layer and the PSM request is places in the completed queue 442b.

When execution of a memory access request is complete, the node from the incoming free queue that was previously occupied by the incoming memory access request in the execute queue 435 is returned to the incoming free queue 431. The previously occupied node becomes available again for being occupied by subsequent memory access requests. Each of the nodes in the PSM execute queue associated with the memory access request being executed are returned to the outgoing free queue 441 as the PSM interface requests occupying these nodes are completed. The previously occupied PSM nodes become available again to be occupied by subsequent PSM interface requests. In some cases, an error occurs when one or more PSM interface requests are transferred to the PSM layer. When an error occurs in the processing of PSM interface requests associated with a memory access request, the node used to process the incoming memory access request may be returned to the incoming free queue, and the PSM nodes used to process the outgoing PSM interface requests may be returned to the outgoing free queue. In other words, the processing of the incoming memory access request is cancelled and not completed when an error occurs.

In some implementations, incoming memory access requests from the FCI layer to the FCTM layer is restricted meaning that during a time that the FCTM layer is processing a memory access request then the FCI layer is barred from issuing another memory access request to the FCTM layer. Implementations that restrict additional incoming memory access requests from the FCI layer protects the FCTM layer from excessive combinations of possible events affecting the FCTM layer and enhances the thread safety of the layer. In some implementations the code, e.g., all of the code, that manages the queues is executed on a single thread and none of the data structures of the FCTM layer, e.g., the queues can be used are manipulated by external entities, e.g., other layers of the hybrid controller.

The FCTM layer can process a number of types of memory access requests received from the FCI layer. FIG. 4A illustrates the process for three types of memory access requests—read requests, promotion requests, and invalidate requests that can come from the FCI layer to the FCTM layer. As explained in more detail herein, read requests are requests from the FCI layer to read host LBAs from the flash, promotion requests are requests from the FCI layer to promote (write) host LBAs into the flash, and invalidate requests are requests from the FCI layer to mark certain host LBAs in the flash as invalid (not containing valid data).

FIG. 4B illustrates the different types of PSM outgoing queues in an exemplary two die system. According to various implementations, a set of queues are maintained per physical flash, the physical flash being capable of processing one request at any given time. Each die can process requests independently of other die in the system. A priority scheme may be used for transferring the incoming and/or outgoing memory access requests between queues. In some cases, the priority scheme may be multi-tiered, wherein a first level of priority is implemented by the FCTM scheduler to select incoming memory access requests from the ready queue and a second level of priority is implemented by the FCTM scheduler when assigning PSM nodes from the outgoing free queue. Requests from FCTM to the PSM may be prioritized in the following order, for example, user read, user write, garbage collection (GC) erase, system area, GC read, and GC write. FIG. 4B shows the exemplary six types of requests from the FCTM to the PSM in six different queues (user read queue, user program queue, garbage collection (GC) erase queue, system queue, GC read queue, GC program queue) for each die in the system. Each of the request queues also has a respective free queue, ready queue, and completed queue.

According to various implementations, user reads have a higher priority than any of the other types of requests and system area requests have the lowest priority. According to some aspects, user reads get the highest priority since the host is waiting for the request to complete. According to some priority schemes, requests that require the least resources and/or are faster to execute may be selected for execution before requests that require more resources and/or are slower to execute. For example, invalidate requests may be selected for execution before read or promotion requests because invalidate requests are the faster to execute. Some priority schemes use a combination of factors when determining the priority level of a request. For example, in a system in which shorter requests are generally executed first, GC erases may still be implemented before GC reads and/or writes even though the erase requests take longer to complete. Choosing GC erases as having a higher priority may be done to free up additional resources. According to various aspects, system area requests do not have the lowest priority to reduce the likelihood that resources are depleted during busy times. In some cases, the garbage collection requests and the system area requests are completed when there are no pending user requests.

Figure 5:
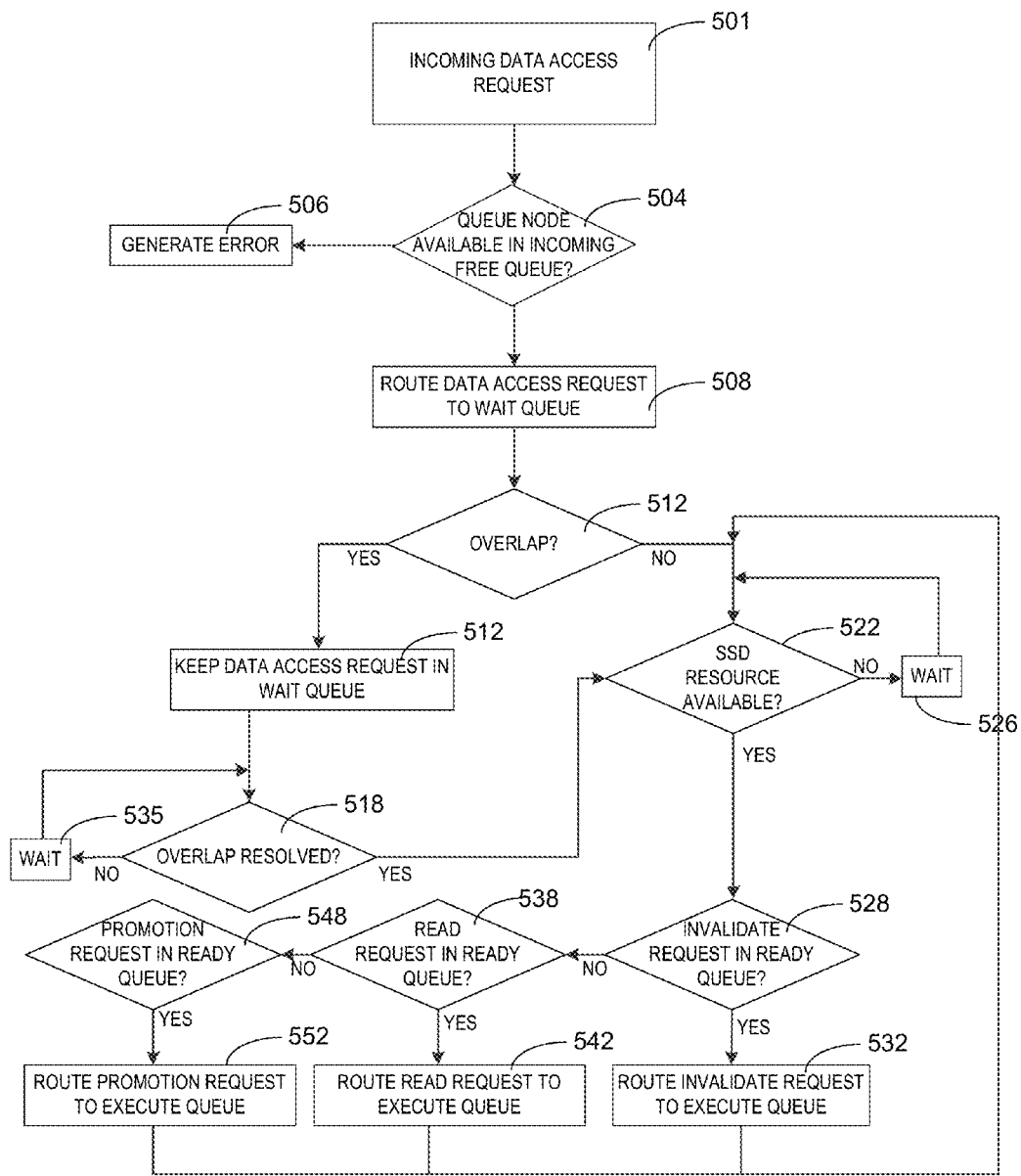
FIG. 5 is a flow diagram that illustrates a priority scheme that may be implemented to route memory access requests according to some embodiments.

The flow diagram of FIG. 5 conceptually illustrates an overview of one priority scheme that may be implemented by the FCTM scheduler for routing memory access requests from the ready queues to the execute queue. As previously discussed, for each incoming memory access request 501, the FCTM scheduler routes the memory access request to the wait queue 508 if there is a node available in the incoming free queue 504. If there are no nodes available 504 in the incoming free queue, the FCTM scheduler generates 506 an error response which is sent to the FCI layer.

The FCTM overlap checker determines 512 if the address range (host LBA range) of the memory access request that is routed to the receive queue overlaps with the address range of other memory access requests. If an overlap is not detected 512, it is determined 522 whether resources are available to execute the request. If an overlap is detected 512, the memory access request is kept 514 in the wait queue. Data access requests routed to the wait queue due to an overlap wait there until the overlap is resolved. If the overlap is resolved 518, it is determined 522 whether there are resources available to complete the request.

Data access requests wait 526 in the wait queue until at least one PSM node in the outgoing free queue is available for execution of the memory access request. Once an PSM node is available, the priority scheme for routing memory access requests to the execute queue is implemented. If there is 528 an invalidate request in the ready queue, the invalidate request is routed to the execute queue 532 and the process returns to the implementation of the priority scheme at step 522. According to the priority scheme, if multiple invalidate requests are present in the invalidate ready queue, these invalidate requests would be processed until the invalidate ready queue is empty. If the invalidate ready queue is empty and there is 538 a read request in the read ready queue, the read request is routed 542 to the execute queue and the process returns to the implementation of the priority scheme at step 522. If there are 528, 538 no invalidate requests or read requests in their respective ready queues and there is 548 a promotion request in the promotion ready queue, the promotion request is routed 552 to the execute queue and the process returns to the implementation of the priority scheme at step 522.

In some scenarios, a priority scheme may be pre-emptive—involving pre-empting requests in the execute queue with requests in the ready queue. In some implementations such a pre-emption takes place if the request in the ready queue would take less time/resources for execution than the request in the execute queue. In one example, invalidate requests in the ready queue preempt promotion requests in the execute queue. Execution of the invalidate requests may cause a delay in the completion of the execution of the promotion request, however, this delay may be minimal because the invalidate requests can be executed very quickly if there is no I/O to the flash.

Figure 6A:
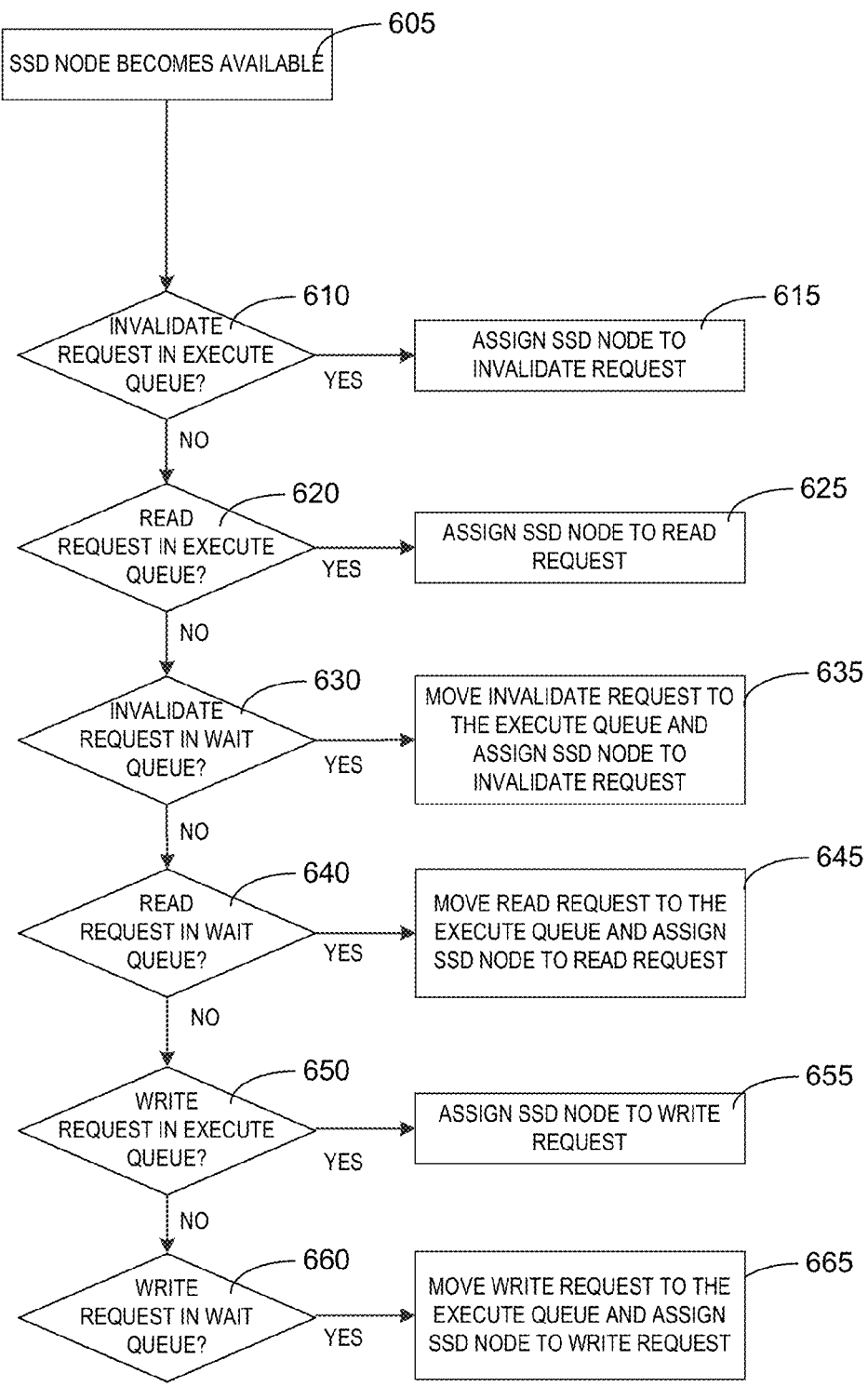
FIGS. 6A and 6B are flow diagrams that illustrate various priority schemes for managing memory access requests in accordance with various embodiments.

One possible implementation of a pre-emptive priority scheme is conceptually illustrated by the flow diagram of FIG. 6A. Such a priority scheme may be implemented alone or as a second level of priority in conjunction with another priority scheme, e.g., the priority scheme discussed in connection with FIG. 5. After the work associated with a PSM interface request occupying a PSM node is completed, the PSM node is returned to the outgoing free queue and becomes available 605 again. A priority scheme is implemented that determines the memory access request to which this available PSM node is next assigned. According to the priority scheme of FIG. 6A, if 610 there is an invalidate request in the execute queue, the PSM node is assigned 615 to the invalidate request. If 620 there is a read request in the execute queue, the PSM node is assigned 625 to the read request. If 630 there is an invalidate request in the ready queue, the invalidate request is moved to the execute queue and the PSM node is assigned 635 to the invalidate request. If 640 there is a read request in the wait queue, the read request is moved to the execute queue and the PSM node is assigned 645 to the read request. If 650 there is a promotion request in the execute queue, the PSM node is assigned 655 to the promotion request. If 660 there is a promotion request in the wait queue, the promotion request is moved to the execute queue and the PSM node is assigned 635 to the promotion request. The priority scheme illustrated in FIG. 5 provides for an optimal ordering in the execution of requests to achieve minimal host request latency.

Note that the priority scheme illustrated in FIG. 6A may mean that a request in the execute queue may be pre-empted by a request for which execution has not yet started. The preempting request may be in the ready queue and, if so, the pre-empting request would be moved to the execute queue and the available PSM node would be assigned to it. Thus, the pre-empting request may delay the execution of a request in the execute queue that is currently being executed.

Figure 6B:
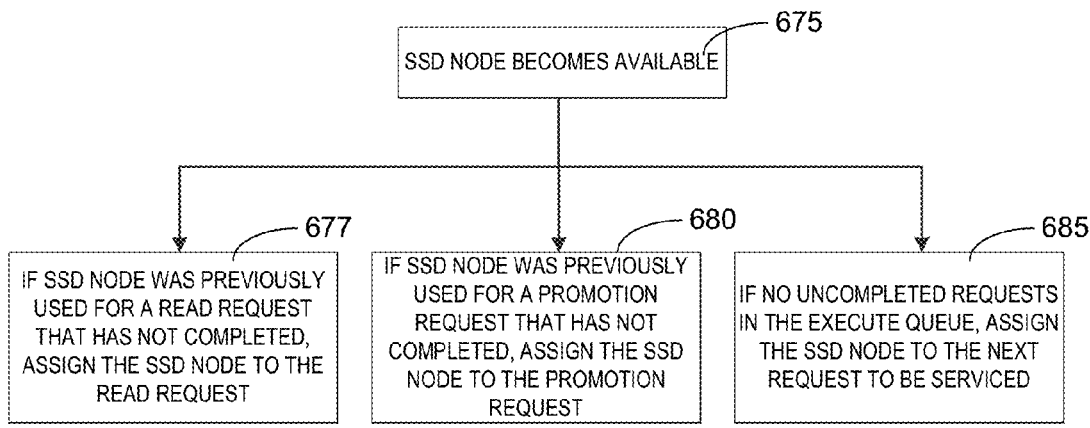

FIG. 6B illustrates another priority scheme that may be used to select requests for assigning available PSM nodes. The priority scheme illustrated in FIG. 6B may be used as a second level priority scheme in conjunction with the priority scheme of FIG. 5. As previously discussed, the PSM nodes are used for PSM interface requests that implement an incoming memory access request. More than one PSM interface request may be needed for a single memory access request in the execute queue. If an PSM interface request occupying an PSM node completes, the node becomes available 675 to service another PSM interface request. According to the priority scheme of FIG. 6B, the PSM nodes that become available and have been used to service PSM interface requests for a particular memory access request in the incoming execute queue would be used to service the next PSM interface requests for the same memory access request in the execute queue until that memory access request is complete. For example, if the PSM node that has become available was previously used by an PSM interface request generated in conjunction with a read request in the incoming execute queue that has not yet completed, then the PSM node is assigned 677 to the next PSM interface request that services the read request in the execute queue. If the PSM node that has become available was previously used by an PSM interface request generated in conjunction with a promotion request in the execute queue that has not yet completed, then the PSM node is assigned 680 to the next PSM interface request that services the promotion request in the execute queue. If the PSM node was used in conjunction with a memory access request that has completed, the PSM node is assigned to an PSM interface request associated with the next memory access request to be serviced.

Figure 7A:
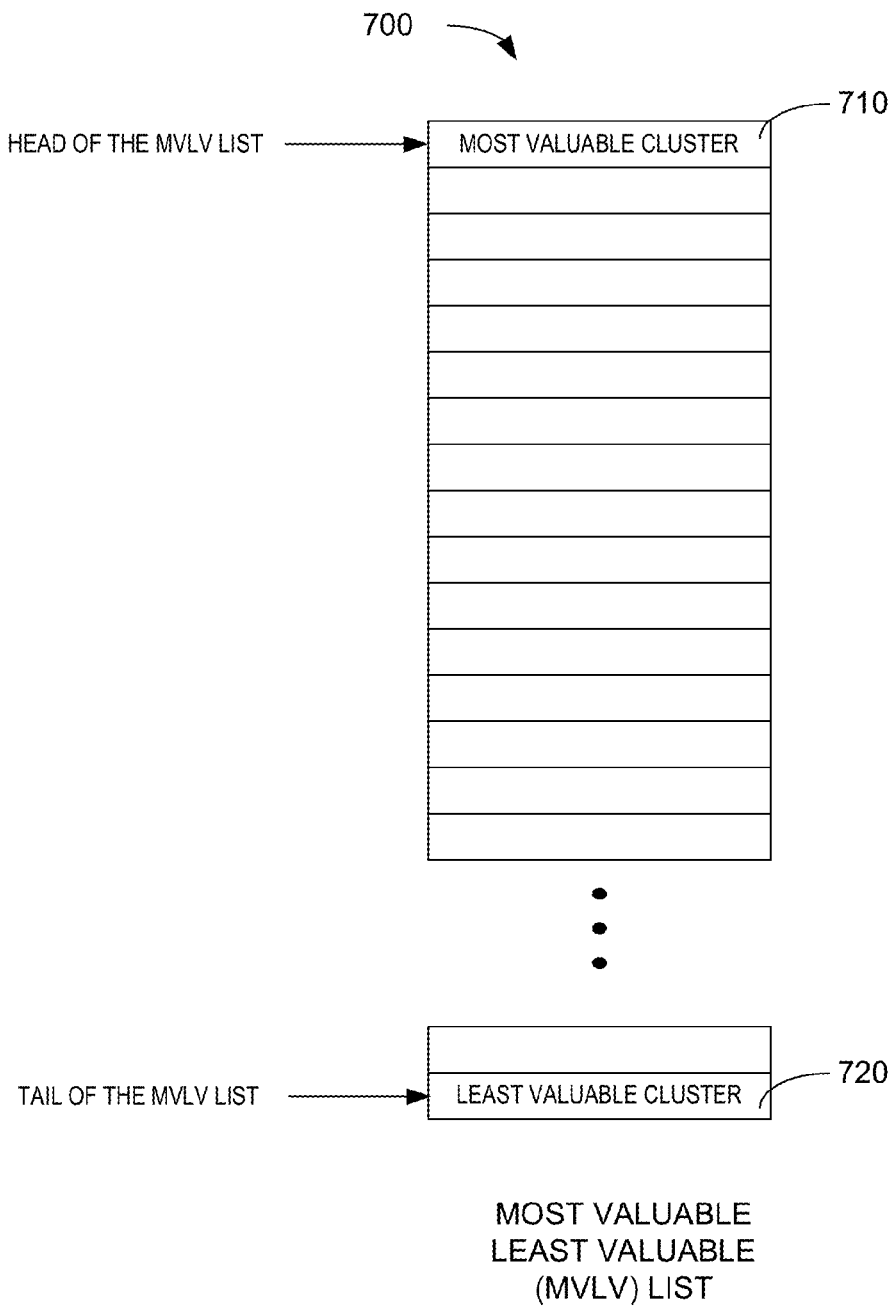
FIG. 7A illustrates a most valuable least valuable list that may be maintained by the hybrid controller of some embodiments.

In some scenarios, the flash memory may be full when a promotion request is executed. If so, the FCTM may cause some data stored in flash to be evicted. To implement evictions, as illustrated in FIG. 7A, the FCTM layer maintains a most valuable least valuable (MVLV) list of clusters 700 which ranks the value of the clusters according to some criteria, which may be based on one or a number of factors such as which of the clusters was most/least recently used and/or which of the clusters is most frequently/least frequently used, for example. One end of the MVLV list 710 is referred to herein as the head, which is the position of the currently most valuable cluster, and the opposite end 720 of the MVLV is referred to as the tail, which is the position of the currently least valuable cluster. If the flash memory is full and a promotion request is executed, the cluster at the tail 720 of the MVLV list is selected for eviction. In some implementations, when a cluster is read or written, that cluster becomes the most valuable cluster, because it was most recently used, and is moved to the head of the MVLV list 710.

The FCTM layer maintains list, e.g., linked list, of free clusters in the flash (denoted the free list) and/or maintains a list, e.g., linked list, of in-use flash clusters (denoted the use list). The free list includes flash clusters that are available for use. The free list may include GCUs that are not yet erased and are ready for new data. A defect list may include clusters that are defective. A ready list comprises erased clusters that have not been programmed. A GC ready list includes clusters that are ready for garbage collection. The GC ready list may be used to differentiate between user programs and garbage collection programs due to user data having a higher priority than garbage collection programs. The FCTM may also include a reserved chain that is used to track clusters that are not to be used for user data. The reserved state may be used to prevent use of reserved areas of the flash such as system areas. In some cases one or more flash clusters may be in a detached state during which the flash clusters are not in either the free state, the defect state, the ready state, the GC ready state, or the reserved state. An flash cluster may be in a detached state, for example, during the time that the clusters are involved in execution of a request, e.g., during the time that data is written to the clusters.

Figure 7B:
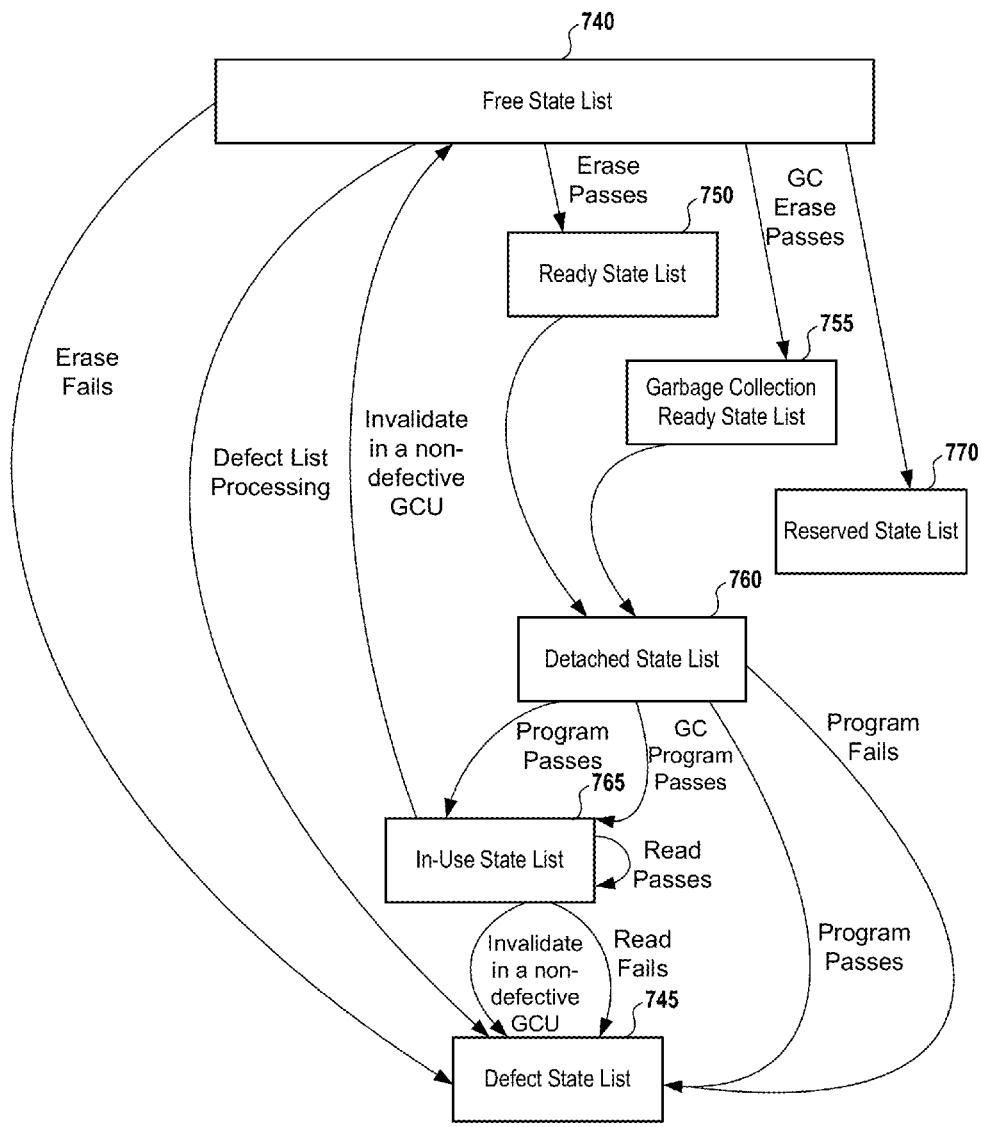
FIG. 7B illustrates transitions between the various chains in accordance with various implementations.

FIG. 7B illustrates transitions of flash clusters between the various states. The clusters in any state are represented as a double linked list of clusters. An erase attempt is made to clusters that are in the free state list 740. If the erase fails, the clusters are moved into the defect state list 745. The clusters that are in the free state list 740 may also be moved into the defect state list 745 due to a defect list processing process. If the erase passes, the clusters are moved into the ready state list 750. If a garbage collection erase passes, the clusters are moved into the garbage collection ready state list 755.

If the clusters in the ready state list 750 or the clusters in the garbage collection ready state list 755 are selected for programming, the clusters are moved into the detached state list 760. A program is attempted on the clusters in the detached state list 760. If the program fails or and/or a garbage collection program fails, the clusters are moved into the defect state list 745. If the program passes and/or a garbage collection program passes the clusters are moved to an in-use state list 765.

A read is attempted on the clusters in the in-use state list 765. If the read passes, the clusters remain in the in-use state list 765. If the read fails, the clusters are moved into the defect state list 745. The in-use clusters may also be invalidated in a defective GCU and are moved into the defect state list 745. According to various embodiments, clusters in the free state list 740 may also be moved to the reserved state list 770 for clusters that are not meant for normal use. In some cases, the clusters in the reserved state list 770 can be used to destroke the flash part. Destroking the flash can be used to reduce the user available capacity of the flash memory to provide more space for system functions as the device ages, for example.

Figure 8:
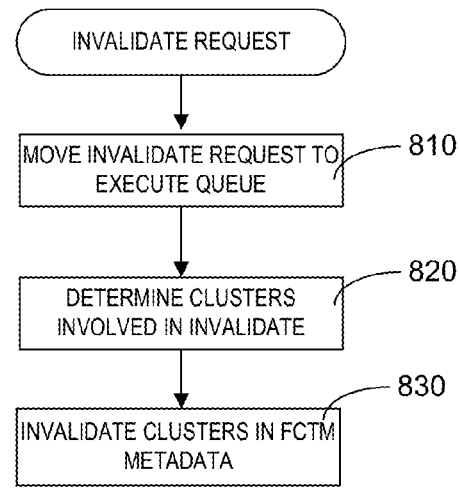
FIGS. 8, 9, and 10 are flow diagrams that illustrate implementation of invalidate, read, and promotion requests, respectively.
Figure 9:
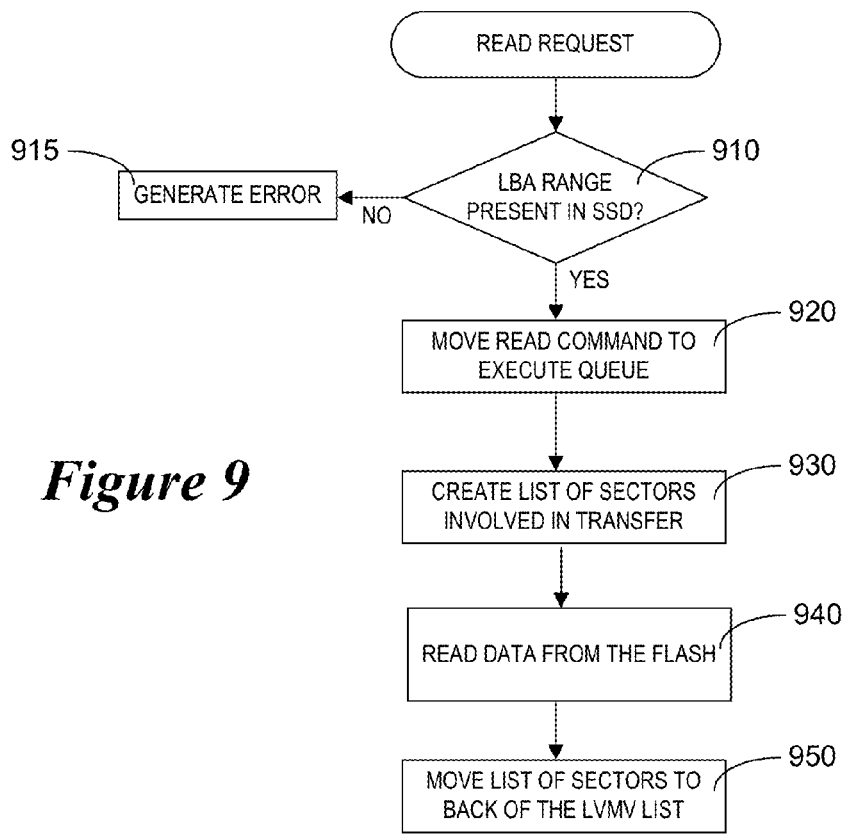
Figure 10:
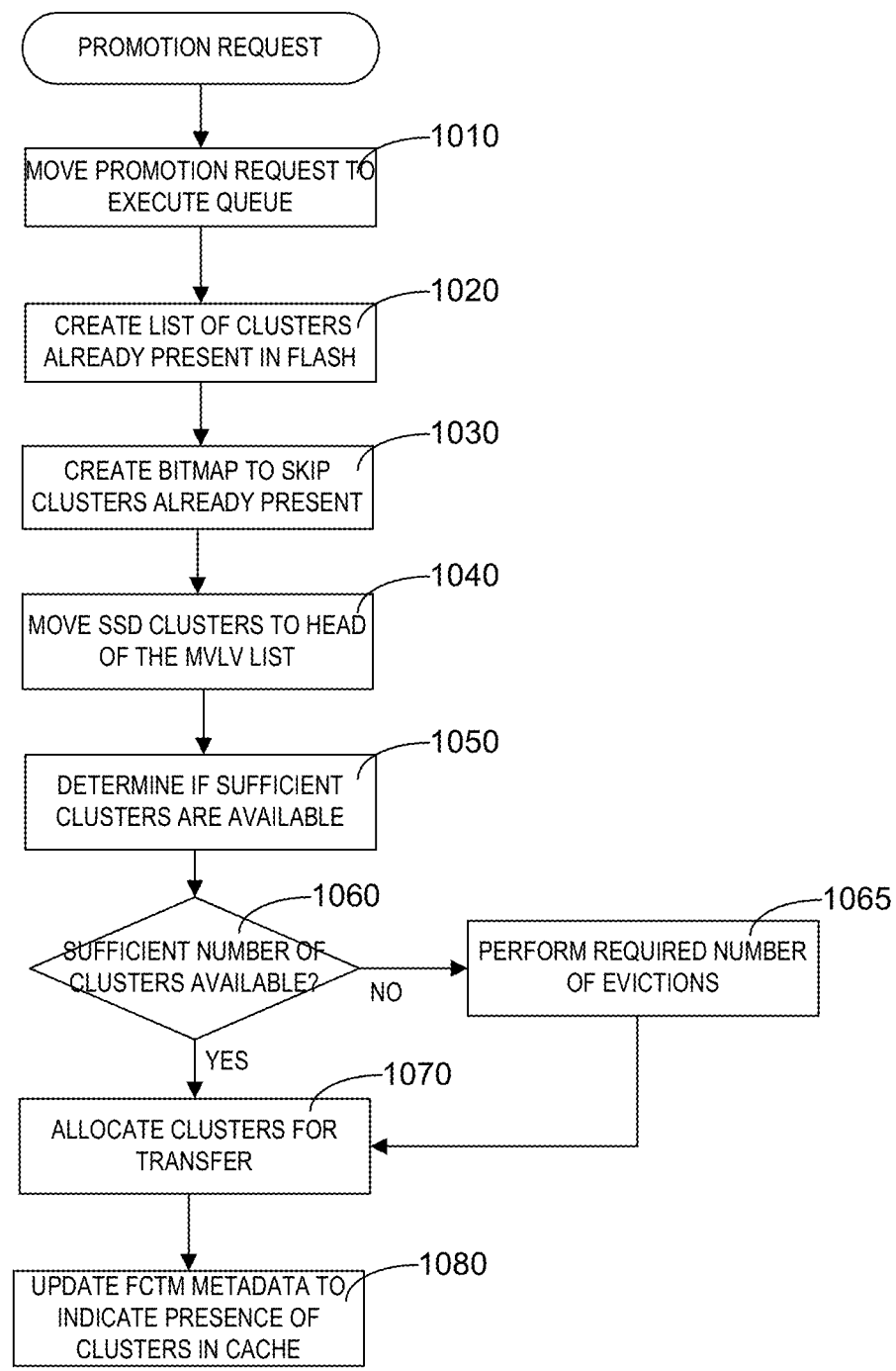

The flow diagrams of FIGS. 8, 9, and 10 conceptually illustrate some steps involved in the execution of invalidate, read, and promotion requests, respectively, performed by the FCTM layer. As previously discussed, each incoming memory access request includes a command portion and a host LBA range. The command portion identifies the type of request and the host LBA range indicates the host LBAs involved in the request. In addition, a promotion request is associated with the data to be written to the LBA range specified in the promotion request.

An invalidate request issued by the FCI layer identifies a cluster aligned range of host LBAs to be invalidated. A cluster aligned LBA range means that the start of the LBA range and the end of the LBA range are not arbitrary, but are multiples of n, which is the number of sectors per cluster. The invalidate request is transferred 810 to the execute queue. The FCTM layer maps the cluster aligned LBA range of the incoming memory access request to the flash clusters and determines 820 the flash clusters involved in the invalidate request. The flash clusters are invalidated 830 (marked as containing invalid data) in the FCTM metadata.

A read request involves reading data corresponding to an arbitrary range of LBAs from the flash memory. The host LBA range of a read request from the FCI is not necessarily cluster aligned. There may be an upper bound on the number of LBAs that can be included in the read request. In the example illustrated in FIG. 9, the FCTM layer initially performs a check to determine if 910 the range of host LBAs specified by the read request is fully present in the flash. If the range of host LBAs is not fully present, the read request is rejected and an error response to the FCI layer is generated 915. The error response notifies the FCI layer to obtain the data requested from the primary memory, e.g., the magnetic disk. If the range of LBAs specified by the read request is fully present in the flash memory, then the read request is moved 920 to the execute queue. The FCTM maps the host LBA range to the flash clusters. A list of flash clusters in the read request is created 930. The list of flash clusters that include the flash clusters of the read request may be made most valuable, e.g. moved 950 to the head of the MVLV list.

A promotion request involves writing a cluster aligned range of host LBAs to the flash memory. There may be an upper bound imposed on the number of LBAs that can be included in one promotion request. The promotion request is moved to the execute queue 1010. A list of the flash clusters corresponding to the cluster aligned host LBA range specified in the promotion request that are already present in the flash is created 1020. The clusters already present in the flash are denoted overlapped clusters. A bitmap is created 1030 to skip over the flash clusters that are already present in the flash. The process of determining the clusters already present in the flash and creating the bitmap mask facilitates conservative use of the flash memory space by maintaining a single copy of any host LBA in the flash. The overlapped flash clusters and the non-overlapped flash clusters are made most valuable by moving 1040 these clusters to the head of the MVLV list. The FCTM determines 1050 if there are a sufficient number of clusters available to store the clusters to be written into the flash. The clusters to be written to the flash are the clusters implicated by the promotion request that are not already present in the flash. If there are 1060 a sufficient number of clusters available, then clusters for storing the data are allocated 1070 and the flash clusters to be stored are transferred to the flash. The metadata of the FCTM layer, i.e., the use list, is updated 1080 to indicate that these clusters are in use. If a sufficient number of clusters is not available 1060, then the FCTM layer will perform evictions 1065 to free up a sufficient number of clusters.

Eviction overlap may lead to data errors. Eviction overlap can occur when the address range being evicted overlaps with the address range of an outstanding command that is in the ready queue or the execute queue. The FCTM scheduler described in various embodiments discussed herein is arranged to operate so that eviction overlap is avoided. To prevent clusters with outstanding reads in the execute queue from being moved during garbage collection, an in-use bit may be set per cluster when outstanding reads exist for them. The garbage collector suspends operations on clusters with this bit set and resumes when the bit is cleared.

If the flash memory is not saturated, i.e., there is a sufficient free space in the flash for promotion without evictions being performed, non-overlapping requests from the FCI layer can execute in any order. For an unsaturated flash, only overlapped requests are placed in the overlap queue. If the flash is saturated, evictions must take place in order to make room for promotion requests to be implemented.

Figure 11:
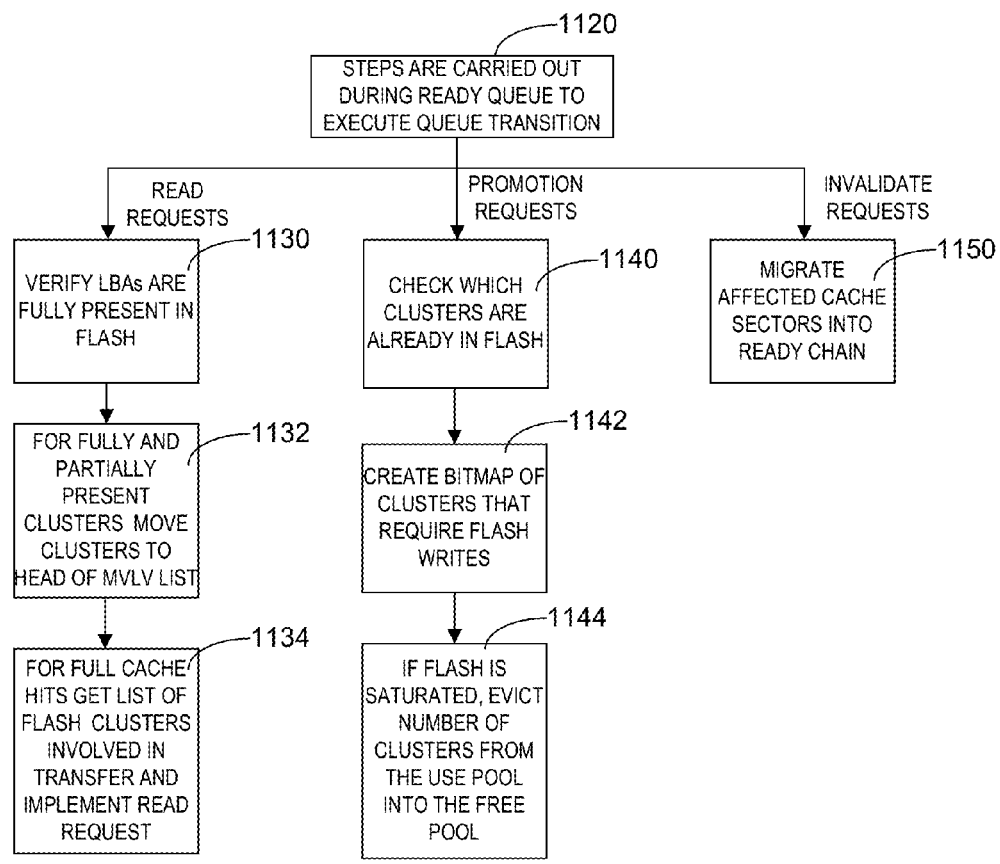
FIG. 11 illustrates processes that are carried out for various memory access requests during the ready queue to execute queue transition according to various embodiments.

As illustrated in FIG. 11, certain steps 1120 are carried out during the ready queue to execute transition for read, promotion, and invalidate requests. These steps may be implemented as atomic operations that are completed without interruption. Performing these steps atomically (without interruption) ensures that no other requests remove these flash clusters from the flash address space before the request has executed. For example, if an invalidate request is received while a read request is executing, the invalidate request will move to the overlap queue so that the invalidate request does not interfere with the execution of the read request. If the invalidate request were serviced during execution of the read request, there is a possibility that the invalidate request would invalidate some LBAs involved in the read request.

For read requests, during the ready queue to execute queue transition, the FCTM scheduler verifies if the LBA range in specified in the request is 1130 fully present in the flash. If the range is not fully present, the read request is not executed and an error response is generated. The flash clusters that correspond to the host LBA range of the read request (whether or not fully present) are made most valuable by moving 1132 these clusters to the head of the MVLV list. If the flash clusters that correspond to the host LBA range of the read request are fully present in the flash, the FCTM scheduler creates 1134 a list the flash clusters and implements the read request, as previously discussed in connection with FIG. 9.

For promotion requests, during the ready queue to execute queue transition, the FCTM scheduler checks 1140 to determine which flash clusters are already present in the flash and creates 1142 a bitmap of the overlapped flash clusters already present in the flash. The bitmap is used to skip writing the overlapped clusters to the flash. If the flash is saturated, the required number of clusters may be evicted 1144 to make room for the new clusters to be written as part of the promotion request.

For invalidate requests implemented, during the ready queue to execute queue transition, the FCTM scheduler migrates 1150 the flash clusters being invalidated into the free list of flash clusters.

Figure 12:
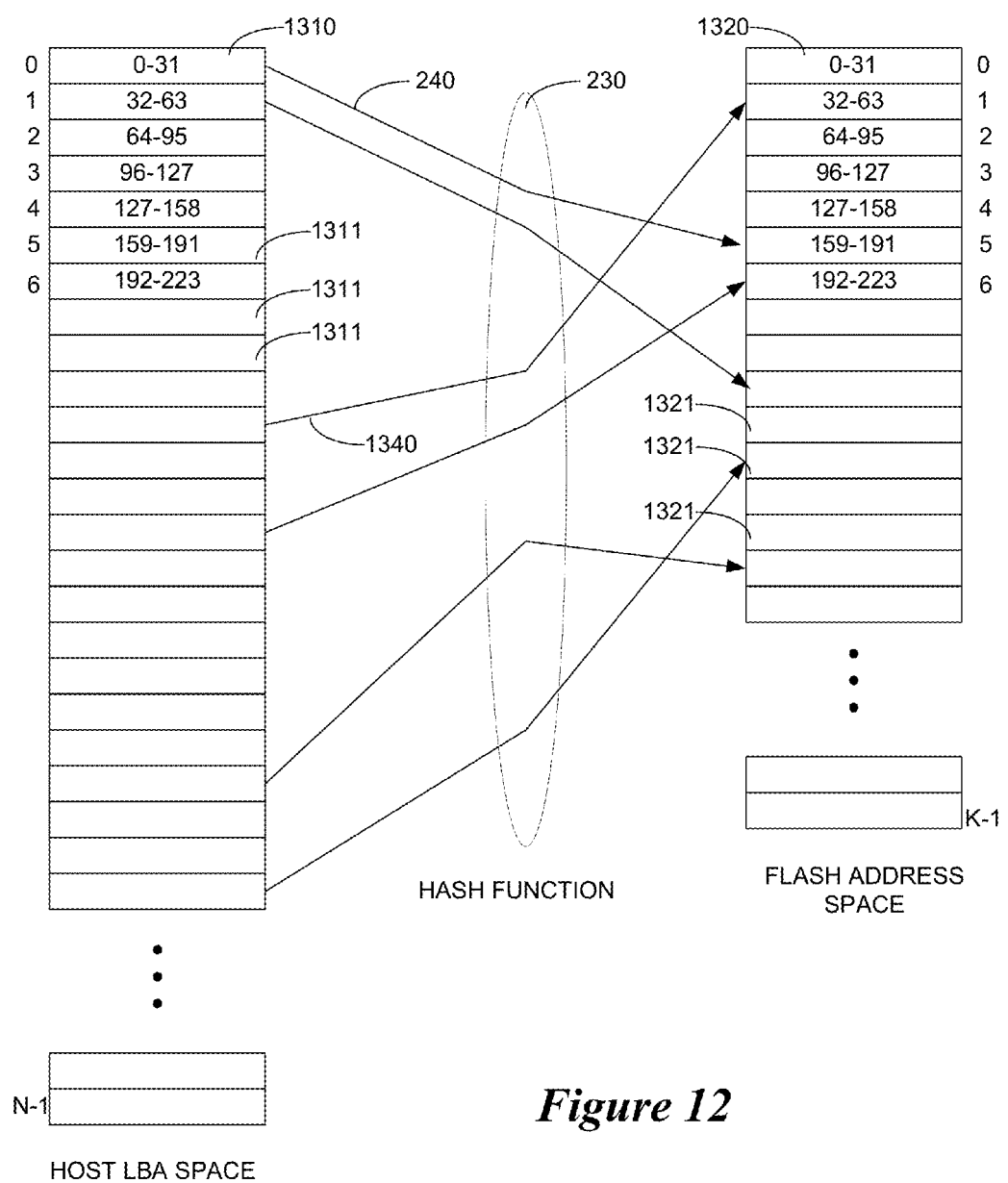
FIG. 12 illustrates a fully associative cache structure according to some embodiments.

The mapping of the host LBA clusters to the flash clusters by the FCTM layer is fully associative meaning that any host LBA cluster can be mapped to any of the flash clusters, so long as there is room in the cache. FIG. 12 diagrammatically depicts mapping of the host LBA space 1310 to the flash address space 1320. In the FCTM layer, the host LBA space is partitioned into clusters of host LBAs and the flash address space is partitioned into clusters. In the host LBA space 1310 each cluster 1311 of host LBAs is uniquely identified by a number between 0 and N−1 and each cluster 1311 includes n contiguous sectors. In the flash address space 1320, each flash cluster 1321 is uniquely identified by a number between 0 and K−1 (K is typically less than N) and each cluster 1321 includes n sectors. The number of sectors per cluster, n, may be fixed and can depend on the size of a host sector, the geometry of the flash memory, the error correction code (ECC) used to store data in the flash memory, and/or other factors. In the example illustrated in FIG. 12, n=32, however, in other implementations, n may be greater than or less than 32. Furthermore, in general, n need not be a power of two.

The mapping from host LBA space 1310 to flash address space 1320 is accomplished by a hash function 1330. As previously discussed, the hash function can support fully associative caching with regard to clusters. In other words, the hash function 1330 allows any host cluster 1311 to be mapped to any flash cluster 321 as indicated by arrows 1340. However, the mapping may be constrained such that any host LBA can exist in only one flash cluster at any given time. The offset within a cluster where an LBA is located within a cluster is fixed and is can be determined by the host LBA modulo the number of host LBAs per cluster, i.e., the remainder resulting from dividing the host LBA by n. Allowing a host LBA cluster to be mapped into any flash cluster and ensuring that promotes and invalidates implemented by the FCTM layer are aligned to cluster boundaries avoids cache fragmentation.

Figure 13:
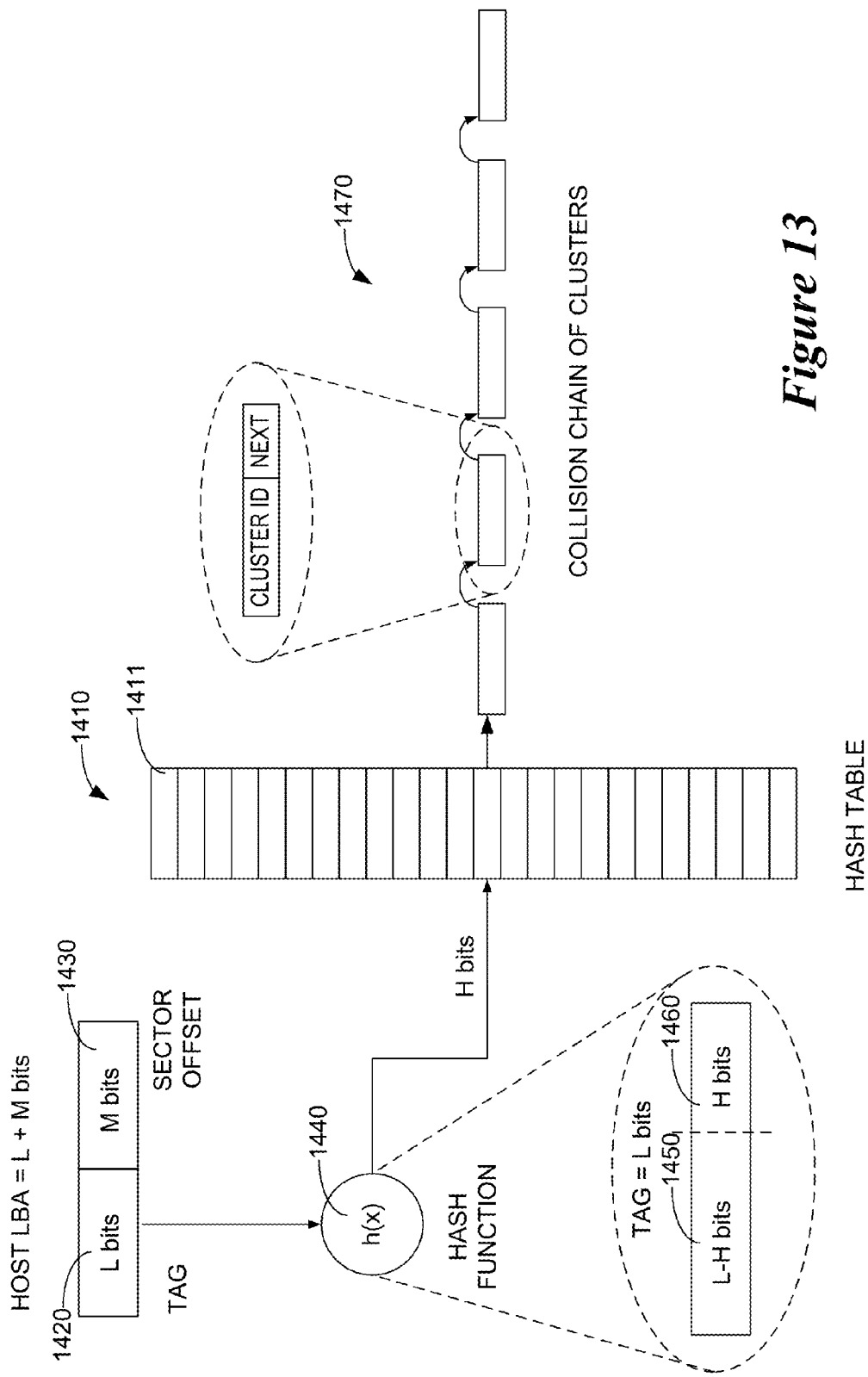
FIG. 13 illustrates a process of mapping host logical block addresses (LBAs) to cache LBAs in accordance with some embodiments.

FIG. 13 is a diagram that illustrates the implementation of the hash function which provides a process for keeping track of the host LBA clusters stored in the flash. In this example, the hash function 1440 is relatively simple, although more complex hash functions could be used. For most implementations, the hash function that is fastest is generally optimal. A hash table 1410 is used to keep track of the mapping of the host LBA space to the flash address space. A number, L, of the more significant bits 1420 of the host LBA are used as a tag to identify the corresponding cluster in the flash address space. The remaining M less significant bits 1430 of the host LBA are used as a sector offset that identifies the sectors within the flash cluster.

The hash function 1440 is used to convert the tag (upper L bits of the host LBA) into a hash table index in the hash table 1410. The entry in the hash table 1410 indicated by the hash table index 1411 (the tag converted by the hash function) points to one or more clusters in the flash address space. For example, for a host LBA of L+M bits, the lower M bits can be used as a sector offset to identify the sector within an flash cluster. The remaining L bits are used for the tag. The hash function 1440 operates on the tag 1420 to generate the index into the hash table 1410. For example, the hash function may discard the upper L-H bits 1450 of the tag and use the lower H bits as the hash table index. Discarding a portion of the tag means that in some cases a number of different host LBAs will map to the same entry 1411 in the hash table, and a collision will occur. An entry 1411 in the hash table 1410 is associated with more than one cluster identification (ID) only if a collision occurs. In this scenario, $2^M$ host LBAs mapped to a cluster will all have the same tag. If the hash function discards the upper bits leaving only H lower bits for the hash table index, the theoretical maximum number of possible collisions (i.e., the number of clusters that map into the same flash address space) is $2^{(L-H)}$. The L-H bits of the tag identify the cluster ID. The collisions are resolved using a linked list 1470. The linked list contains the cluster IDs that are hashed to the same entry in the hash table (i.e., have the same hash index). To access a particular cluster, the linked list is scanned for an entry with the correct cluster ID. For example, when the FCI layer requests a look up involving a particular host LBA cluster, the FCTM layer applies the hash function, and if there is a collision (two clusters that map to the same space) then the FCTM layer traverses through the linked list to locate the requested cluster.

The above description assumes that the number of host sectors per cluster is a power of two. However, non-power of two sector sizes may also be used. A representative set of host sector sizes that are supportable by the fully associative cache structure described herein include, but is not limited to, the following sector sizes: 512, 520, 524, 528, 4096, 4192, and 4224 bytes. For example, based on sector to cluster mapping calculations, there may be 30 5XX byte sectors per cluster (assuming a cluster is 16 KB of the flash, such as an 8 KB flash page size with dual plane support).

Non-powers of two can be handled by modifying the mapping described above as follows: The tag is determined as tag=host LBA/sectors per cluster, where / indicates an integer division via truncation and the host sector offset within the cluster is determined by host LBA modulo the sectors per cluster, i.e., the remainder after dividing the host LBA by the sectors per cluster.

The division and modulo operations can be implemented by executing a multiply instruction, e.g., a 64 bit multiply instruction on the FCTM processor, assuming the FCTM processor supports 64 bit multiple instructions. To facilitate the multiply, the value p=0xFFFFFFFF/sectors per cluster is pre-computed—is a constant value. The tag is now determined by tag=(host LBA*p)>>32, where * indicates a 64 bit multiply operation and where >>32 means that the result of (host LBA*p) is right shifted 32 times. Using this process, there is a possibility that the tag is off by one. To correct for this occurrence, the tag is incremented by one if the following condition is satisfied: (Host LBA−tag*sectors per cluster≥sector per cluster. The remainder can be similarly determined.

The hybrid flash management system described herein may not need to expose a fixed capacity. Blocks that are defected are moved into the defect chain. All remaining blocks may be in play at all times. According to various embodiments, the length of the free chain remains above a predetermined threshold. The predetermined threshold may be adjusted according to a desired write amplification. The length of the free chain may be accomplished by forcing evictions when the length gets below a second threshold.

Program and erase errors cause blocks to be defected. All clusters within the block are moved to the defect chain and a bitmap is used to remember the location of defects. This bitmap may be periodically saved to the reserved system area in the flash so that it can be restored at the next power on.

It is to be understood that this detailed description is illustrative only, and various additions and/or modifications may be made to these embodiments, especially in matters of structure and arrangements of parts and/or processes. Accordingly, the scope of the present disclosure should not be limited by the particular embodiments described above, but should be defined by the claims set forth below and equivalents thereof.

What is claimed is:

1. A device, comprising:
    a hybrid controller configured to manage data transfers between a host processor and a secondary memory, the secondary memory configured to serve as a cache for a primary memory, the primary memory including a memory space corresponding to host logical block addresses (LBAs), the hybrid controller configured to:
    receive incoming memory access requests from the host processor, the memory access requests including a range of host LBAs;
    route the incoming memory access requests to a set of incoming queues by implementing a priority scheme, comprising:
        routing invalidate requests in an invalidate ready queue to an execute queue as a first priority, the execute queue including requests that are ready to be executed;
        routing read requests in a read ready queue to the execute queue as a second priority; and
        routing promotion requests in a promotion ready queue as a third priority;
    map the range of host LBAs directly into clusters of the secondary memory;
    transform each incoming memory access request into one or more outgoing memory access requests, each outgoing memory access request including a range or cluster of secondary memory;
    route the outgoing memory access requests from the incoming queues into a set of outgoing queues; and
    access the secondary memory using the outgoing memory access requests.

2. The device of claim 1, wherein the incoming memory access requests comprise:
    read requests, each read request respectively including a host LBA range;
    write requests, each write request respectively including a host LBA range that is aligned to secondary memory clusters; and
    invalidate requests, each invalidate request respectively including a host LBA range that is aligned to secondary memory clusters.

3. The device of claim 2, wherein the incoming queues include one or more of:
    a wait queue, each wait queue including requests that are waiting to be executed; and
    an execute queue including requests that are ready to be executed.

4. The device of claim 3, wherein the wait queue includes requests that conflict with other requests.

5. The device of claim 2, wherein the set of incoming queues include:
    an incoming free queue containing a number of incoming nodes; and
    a wait queue, wherein an incoming node is removed from the incoming free queue when a memory access request is queued in the wait queue and the incoming node is returned to the incoming free queue after the memory access request is completed.

6. The device of claim 2, wherein the outgoing queues include one or more of:
    a set of ready queues, each ready queue of the set of ready queues configured to queue memory access requests that are ready for execution.

7. The device of claim 6, wherein the set of outgoing queues comprises:
    an outgoing free queue containing a number outgoing nodes;
    one or more outgoing execute queues;
    wherein an outgoing node is removed from the outgoing free queue when an outgoing memory access request is queued in one of the outgoing execute queues and the outgoing node is returned to the outgoing free queue after the memory access request is completed.

8. The device of claim 6, wherein the set of outgoing queues comprises an outgoing completed queue, the completed queue including requests that have been executed.

9. A method of operating a hybrid memory system that includes a primary memory and a secondary memory, the method comprising:
    routing incoming memory access requests in a set of incoming queues according to a priority scheme, the incoming memory access requests comprising a range of host logical block addresses (LBAs) that correspond to a memory space of the primary memory the priority scheme, comprising:
        routing invalidate requests in an invalidate ready queue to an execute queue as a first priority, the execute queue including requests that are ready to be executed;
        routing read requests in a read ready queue to the execute queue as a second priority; and
        routing promotion requests in a promotion ready queue as a third priority;
    directly mapping the host LBA range to clusters of secondary memory, the clusters of secondary memory corresponding to a memory space of the secondary memory;
    transforming each incoming memory access request queued in the set of incoming queues into one or more outgoing memory access requests, the outgoing memory comprising a range of secondary memory or one or more clusters of secondary memory;
    routing the one or more outgoing memory access requests in a set of outgoing queues; and
    accessing the secondary memory using the outgoing memory access requests.

10. The method of claim 9, wherein routing the incoming memory access requests comprises implementing a priority scheme for routing the memory access requests in the set of incoming queues.

11. The method of claim 10, wherein the priority scheme includes routing memory access requests that take a smaller amount of time to execute before routing memory access request that take a larger amount of time to execute.

12. The method of claim 10, wherein the priority scheme includes routing host memory access requests before routing memory access requests that do not originate in the host.

13. The method of claim 10, wherein the priority scheme includes routing garbage collection requests when there are no outstanding host initiated requests.

14. A controller system for a hybrid memory system, the controller comprising:
a hybrid controller configured to control data transfers between the host processor and a flash memory, the flash memory configured to serve as a cache for a magnetic disk, the hybrid controller comprising:
a flash content and transfer management (FCTM) layer configured to:
receive the incoming memory access requests from a higher layer of the hybrid controller;
route the incoming data access requests in a set of incoming queues by implementing a priority scheme, comprising:
routing invalidate requests in an invalidate ready queue to an execute queue as a first priority, the execute queue including requests that are ready to be executed;
routing read requests in a read ready queue to the execute queue as a second priority; and
routing promotion requests in a promotion ready queue as a third priority;
transform each of the memory access requests from the set of incoming queues into a plurality of outgoing memory access requests;
route the plurality of outgoing memory access requests in a set of outgoing queues; and
send the outgoing memory access requests to a lower layer of the hybrid controller.

15. The controller system of claim 14, wherein the incoming memory access requests comprise:
read requests, each read request respectively including a host LBA range;
write requests, each write request respectively including a host LBA range that is aligned to secondary memory clusters; and
invalidate requests, each invalidate request respectively including a host LBA range that is aligned to secondary memory clusters.

16. The controller system of claim 15, wherein the incoming queues include one or more of:
a free queue containing a number of incoming nodes;
a wait queue, each wait queue including requests that are waiting to be executed; and
an execute queue including requests that are ready to be executed.

17. The controller system of claim 16, wherein the FCTM layer is configured to remove an incoming node from an incoming free queue when a memory access request is queued in a wait queue and return the incoming node to the incoming free queue after the memory access request is completed.

18. The controller system of claim 15, wherein the outgoing queues include one or more of:
a set of ready queues, each ready queue of the set of ready queues configured to queue memory access requests that are ready for execution;
one or more outgoing execute queues;
a free queue containing a number outgoing nodes wherein the FCTM layer is configured to remove an outgoing node from the outgoing free queue when an outgoing memory access request is queued in one of the outgoing execute queues and return the outgoing node to the outgoing free queue after the memory access request is completed; and
the set of outgoing queues comprises an outgoing completed queue, the completed queue including requests that have been executed.

* * * * *